United States Patent [19]

Klein et al.

[11] 4,450,224

[45] May 22, 1984

[54] POLYMERIC MORDANTS

[75] Inventors: Gerald W. Klein; Robert A. Snow, both of Pittsford; Richard C. Sutton, Rochester, all of N.Y.

[73] Assignee: Eastman Kodak Company, Rochester, N.Y.

[21] Appl. No.: 511,129

[22] Filed: Jul. 6, 1983

[51] Int. Cl.$^3$ .......................... G03C 1/40; G03C 5/54; C08F 26/06; C08F 126/06

[52] U.S. Cl. .................................... 430/213; 430/941; 525/326.7; 525/916; 525/329.2; 526/258; 428/522

[58] Field of Search ................ 430/213, 941; 526/258; 525/916, 326.7, 329.2; 101/464; 428/522

[56] References Cited

U.S. PATENT DOCUMENTS 4,124,386 11/1978 Yoshida et al. ...................... 430/213

4,273,853 6/1981 Ponticello et al. .................. 430/213

*Primary Examiner*—Richard L. Schilling

*Attorney, Agent, or Firm*—Harold E. Cole

[57] ABSTRACT

Photographic element and diffusion transfer assemblages are described which contain a novel mordant comprising recurring units having the formula

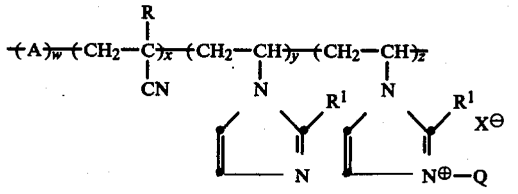

wherein A represents recurring units derived from an $\alpha,\beta$-ethylenically unsaturated monomer;

R represents hydrogen or methyl;

each $R^1$ independently represents hydrogen or an alkyl group of 1 to about 4 carbon atoms;

Q represents an alkyl, substituted alkyl, cycloalkyl, aryl or substituted aryl group;

$X^\ominus$ represents an anion;

w is from about 0 to about 25 mole percent;

x is from about 30 to about 90 mole percent;

y is from about 8 to about 65 mole percent;

and z is from about 2 to about 9 mole percent.

33 Claims, No Drawings

POLYMERIC MORDANTS

This invention relates to photography, and more particularly to color diffusion transfer photography employing a novel polymeric mordant as herein defined. Dye images bound by the mordant of this invention have an improved stability to light and improved image sharpness, especially under conditions of high temperature and humidity.

Various formats for color, integral transfer elements are described in the prior art, such as U.S. Pat. Nos. 3,415,644; 3,415,645; 3,415,646; 3,647,437; 3,635,707; 3,756,815, and Canadian Pat. Nos. 928,559 and 674,082. In these formats, the image-receiving layer containing the photographic image for viewing remains permanently attached and integral with the image generating and ancillary layers present in the structure when a transparent support is employed on the viewing side of the assemblage. The image is formed by dyes, produced in the image generating units, diffusing through the layers of the structure to a dye image-receiving layer comprising a mordant which binds the dye image thereto. After exposure of the assemblage, an alkaline processing composition permeates the various layers to initiate development of the exposed photosensitive silver halide emulsion layers. The emulsion layers are developed in proportion to the extent of the respective exposures, and the image dyes which are formed or released in the respective image generating layers begin to diffuse throughout the structure. At least a portion of the imagewise distribution of diffusible dyes diffuses to the dye image-receiving layer to form an image of the original subject.

Dye stability is an important consideration in any photographic system. All photographic dyes are, to a greater or lesser degree, unstable to light. Any improvement in dye stability, however slight, is desirable provided other properties are not affected.

U.S. Pat. No. 4,124,386 relates to mordants comprising vinylimidazole polymers which may be partially quaternized. Included in a list of possible comonomers is acrylonitrile. Specific copolymers listed in columns 9 and 10 include those with quaternized vinylimidazole of from 10 to 40 mole percent. A specific comonomer mentioned is styrene. U.S. Pat. No. 4,273,853 also relates to mordants containing partially quaternized vinylimidazole, the quaternized component comprising from 0 to 40 mole percent. Also included in a list of possible comonomers is acrylonitrile. As will be shown by comparative tests hereinafter, the polymer of the invention must be selected so that a quaternized vinylimidazole component in the polymer must not be greater than about 9 mole percent in order to provide improved dye stability and image sharpness in the dyes mordanted thereto. These results cannot be obtained without the acrylonitrile component and the quaternized vinylimidazole component in the proportions as stated herein.

The mordants of this invention also have good "dye-holding" properties which produce sharp images having good $D_{min}/D_{max}$ discrimination. In addition, these mordants are essentially colorless, have low stain, are stable upon keeping, are easy to coat using conventional techniques as dispersions or solution polymers and do not produce dye hue shifts.

A photographic element in accordance with the invention comprises a support having thereon at least one photosensitive silver halide emulsion layer having associated therewith a dye image-providing material, the support also having thereon a dye image-receiving layer comprising a mordant which is a polymer comprising recurring units having the formula:

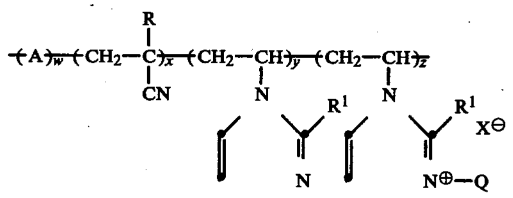

wherein

A represents recurring units derived from an $\alpha,\beta$-ethylenically unsaturated monomer;

R represents hydrogen or methyl;

each $R^1$ independently represents hydrogen or an alkyl group of 1 to about 4 carbon atoms, such as methyl, ethyl, propyl, isopropyl, butyl or isobutyl;

Q represents an alkyl, substituted alkyl, cycloalkyl, aryl or substituted aryl group;

$X^\ominus$ represents an anion;

w is from about 0 to about 25 mole percent, preferably about 5 to about 15 mole percent;

x is from about 30 to about 90 mole percent, preferably about 40 to about 60 mole percent;

y is from about 8 to about 65 mole percent, preferably about 25 to about 45 mole percent; and z is from about 2 to about 9 mole percent, preferably about 3 to about 6 mole percent.

A in the formula above represents recurring units derived from one or more $\alpha,\beta$-ethylenically unsaturated monomers such as acrylic esters, e.g., methyl methacrylate, butyl acrylate, butyl methacrylate, ethyl acrylate, phenoxyethyl acrylate, and cyclohexyl methacrylate; vinyl esters, such as vinyl acetate; amides, such as acrylamide, diacetone acrylamide, N-methylacrylamide and methacrylamide; ketones, such as methyl vinyl ketone, ethyl vinyl ketone and p-vinylacetophenone; halides, such as vinyl chloride and vinylidene chloride; ethers, such as methyl vinyl ether, ethyl vinyl ether and vinylbenzyl methyl ether; $\alpha,\beta$-unsaturated acids, such as acrylic acid and methacrylic acid and other unsaturated acids such as vinylbenzoic acid; simple heterocyclic monomers, such as vinylpyridine and vinylpyrrolidone; olefins, such as ethylene, propylene, butylene and styrene as well as substituted styrene; diolefins, such as butadiene and 2,3-dimethylbutadiene, and other vinyl monomers within the knowledge and skill of an ordinary worker in the art. Styrene is employed to provide A in a preferred embodiment of the invention.

In the above formula, Q represents an alkyl or substituted alkyl group, cycloalkyl, aryl or substituted aryl group, such as methyl, ethyl, butyl, hydroxyethyl, hydroxypropyl, dihydroxypropyl, cyclohexyl, phenyl, xylyl, tolyl, benzyl, diphenylmethyl, 4-methoxybenzyl, p-methoxyphenyl, 3,4-dimethoxyphenyl, 3,4-dimethoxybenzyl, 3,4-methylenedioxybenzyl, 3,4-ethylenedioxyphenyl, 2-(2,4,5-trimethoxyphenoxy)ethyl, 3-(3,4-dimethoxyphenoxy)-2-hydroxypropyl, 3-(2,4,5-trimethoxyphenoxy)-2-hydroxypropyl, 3,5-diethoxyphenyl, p-chlorobenzyl, 3,4-dibromobenzyl, 3-(4-methoxyphenoxy)-2-hydroxypropyl, 3-(3,4-dimethoxyphenyl)propyl, 2-(3,4-methylenedioxyphenoxy)ethyl, or 2-(3,4-dimethoxyphenoxy)ethyl.

In a preferred embodiment of the invention R is hydrogen, each $R^1$ is hydrogen, w is 0 and Q is a hydroxyalkyl group. In another preferred embodiment of the invention, R is hydrogen, each $R^1$ is hydrogen, Q is a hydroxyalkyl group, A represents a styrene moiety, and w is from about 5 to about 15 mole percent. In another preferred embodiment of the invention the styrene moiety is substituted with at least one methoxy or methylenedioxy group. In yet another preferred embodiment of the invention, R is hydrogen, each $R^1$ is hydrogen and Q is benzyl, 3-(4-methoxyphenoxy)-2-hydroxypropyl, 3-(3,4-dimethoxyphenyl)propyl, 2-(3,4-methylenedioxyphenoxy)ethyl, or 2-(3,4-dimethoxyphenoxy)ethyl.

$X^{\ominus}$ in the above formula represents an anion, such as bromide, chloride, acetate, a dialkyl phosphate, propionate, methanesulfonate, methyl sulfate, or a benzene or substituted benzene sulfonate, such as p-toluenesulfonate.

Although some photographic mordants are known that have good initial image sharpness and retain this sharpness under high humidity incubation conditions, their dye-light stability has been acceptable only if they have been used in conjunction with stabilizers and other addenda. The mordant polymers of the present invention give both good image sharpness and dye-light stability in simplified formulation mordant receivers with fewer components. This reduces coating difficulties and aids in producing more uniform coatings.

Conventional bulk, solution or bead vinyl addition polymerization techniques can be used to prepare the polymers of this invention as described in M. P. Stevens, "Polymer Chemistry—An Introduction", Addison Wesley Publishing Company, Reading, Mass. (1975), the disclosure of which is hereby incorporated by reference. However, continuous vinyl polymerization techniques are preferred.

Examples of novel polymers within the scope of the invention include the following:

Compound 1

Poly[acrylonitrile-co-1-vinylimidazole-co-3-(2-hydroxyethyl)-1-vinylimidazolium chloride] (mole ratio 56:40:4)

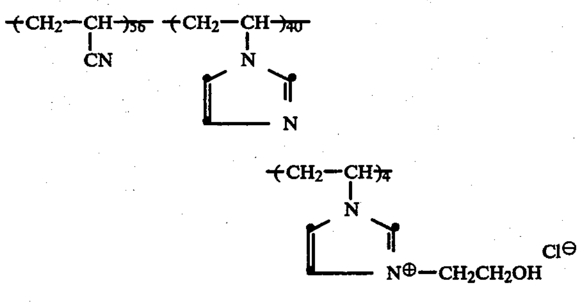

Compound 2

Poly[acrylonitrile-co-1-vinylimidazole-co-3-(2-hydroxyethyl)-1-vinylimidazolium chloride] (mole ratio 82:15:3)

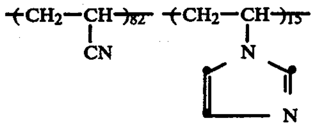

-continued

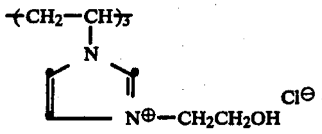

Compound 3

Poly{acrylonitrile-co-1-vinylimidazole-co-3-[3-(4-methoxyphenoxy)-2-hydroxypropyl]-1-vinylimidazolium propionate} (mole ratio 56:37:7)

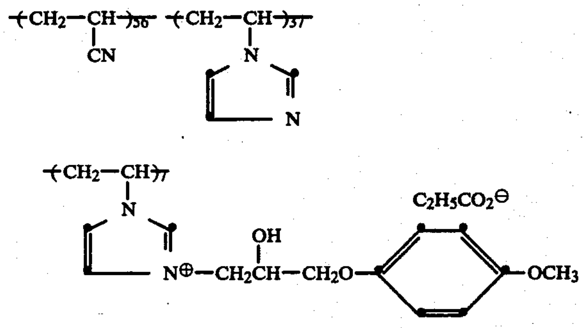

Compound 4

Poly[3,4-methylenedioxystyrene-co-acrylonitrile-co-1-vinylimidazole-co-3-(2-hydroxyethyl)-1-vinylimidazolium chloride] (mole ratio 8:50:40:2)

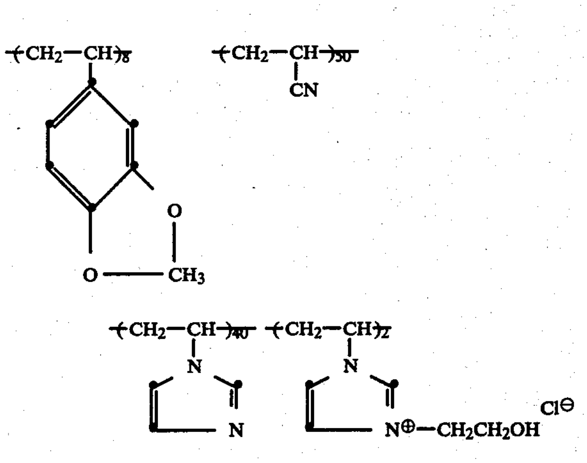

Compound 5

Poly[3,4-methylenedioxystyrene-co-acrylonitrile-co-1-vinylimidazole-co-3-(2-hydroxyethyl)-1-vinylimidazolium chloride] (mole ratio 8:49:39:4)

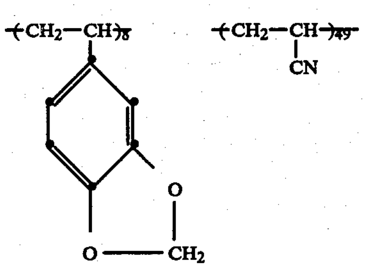

-continued

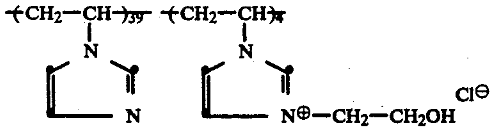

Compound 6

Poly[3,4-methylenedioxystyrene-co-acrylonitrile-co-1-vinylimidazole-co-3-(2-hydroxyethyl)-1-vinylimidazolium chloride] (mole ratio 8:48:39:5)

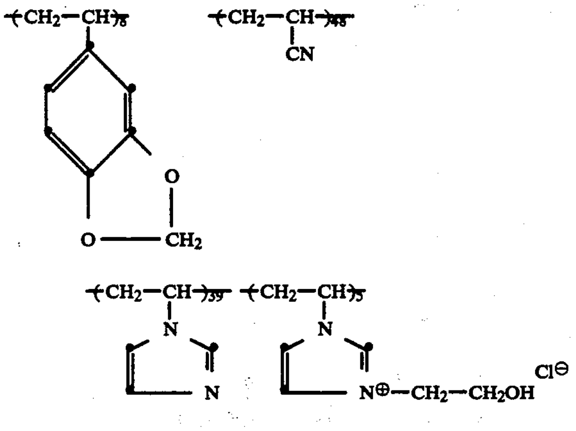

Compound 7

Poly[3,4-methylenedioxystyrene-co-acrylonitrile-co-1-vinylimidazole-co-3-(2-hydroxyethyl)-1-vinylimidazolium chloride] (mole ratio 8:47:38:7)

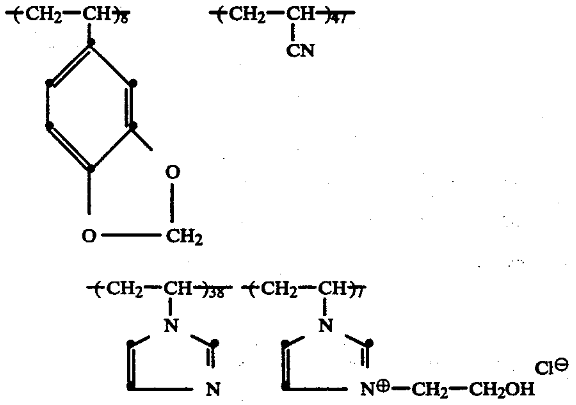

Compound 8

Poly{3,4-dimethoxystyrene-co-acrylonitrile-co-1-vinylimidazole-co-3-[3-(3,4-dimethoxyphenyl)propyl]-1-vinylimidazolium methanesulfonate} (mole ratio 22:44:29:5)

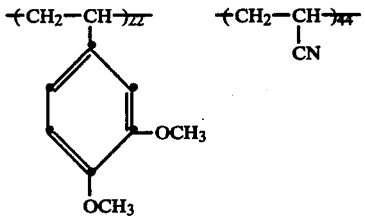

-continued

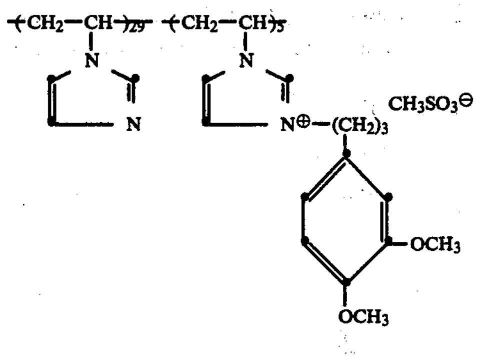

Compound 9

Poly[3,4-dimethoxystyrene-co-acrylonitrile-co-1-vinylimidazole-co-3-(2-hydroxyethyl)-1-vinylimidazolium chloride] (mole ratio 8:44:39:9)

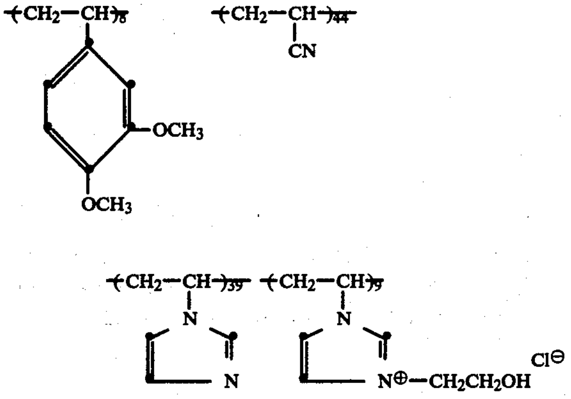

Compound 10

Poly[3,4-methylenedioxystyrene-co-acrylonitrile-co-1-vinylimidazole-co-3-(2-hydroxyethyl)-1-vinylimidazolium chloride] (mole ratio 9:50:36:5)

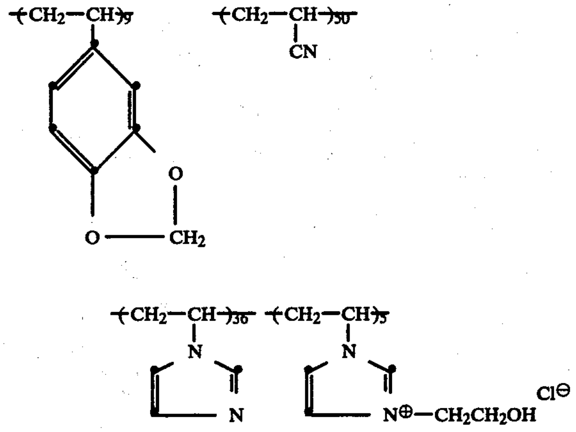

Compound 11 Poly{cyclohexyl methacrylate-co-acrylonitrile-co-1-vinylimidazole-co-[3-(3,4-dimethoxyphenyl)propyl]-1-vinylimidazolium methanesulfonate} (mole ratio 8:52:35:5)

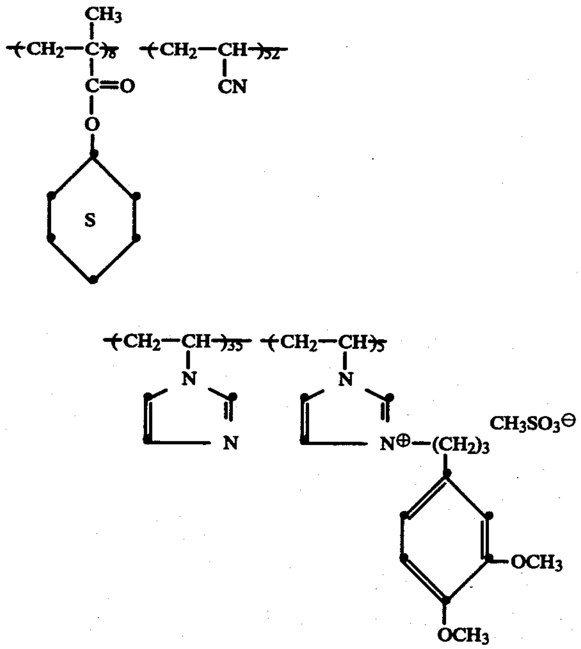

Compound 12 Poly{cyclohexyl methacrylate-co-acrylonitrile-co-1-vinylimidazole-co-[2-(3,4-dimethoxyphenoxy)ethyl]-1-vinylimidazolium methanesulfonate} (mole ratio 8:52:32:8)

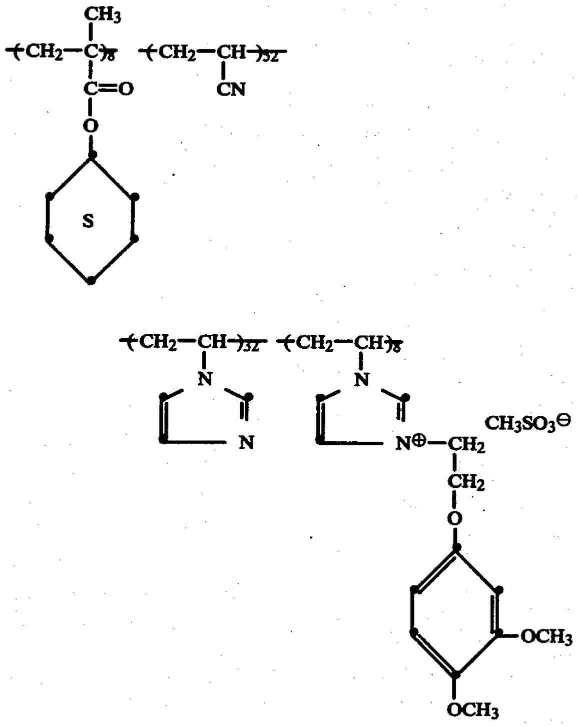

Compound 13 Poly{cyclohexyl methacrylate-co-acrylonitrile-co-1-vinylimidazole-co-[2-(3,4-methylenedioxyphenoxy)ethyl]-1-vinylimidazolium methanesulfonate} (mole ratio 8:52:32:8)

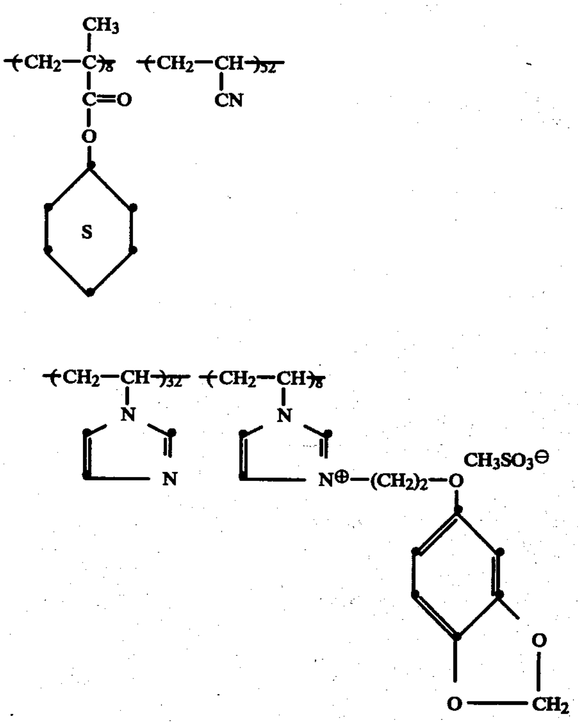

Compound 14

Poly[3,4-methylenedioxyphenoxyvinyl-co-acrylonitrile-co-1-vinylimidazole-co-3-(2-hydroxyethyl)-1-vinylimidazolium chloride] (mole ratio 10:45:38:7)

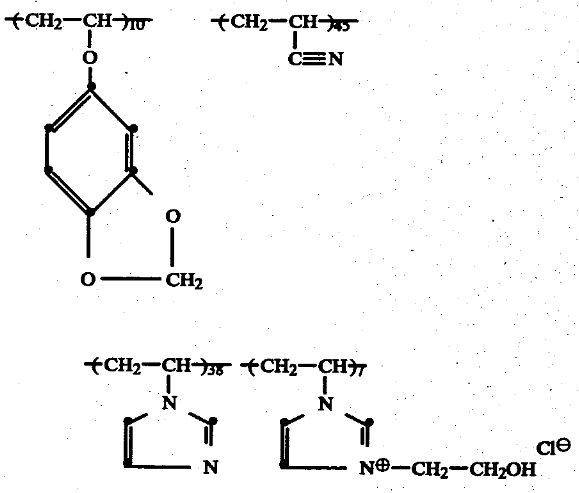

Compound 15

Poly[2-(3,4-methylenedioxy-6-methoxyphenoxy)ethyl methacrylate-co-acrylonitrile-co-1-vinylimidazole-co-3-(2,2,2-hydroxymethyl)ethyl-1-vinylimidazolium chloride] (mole ratio 8:50:34:8)

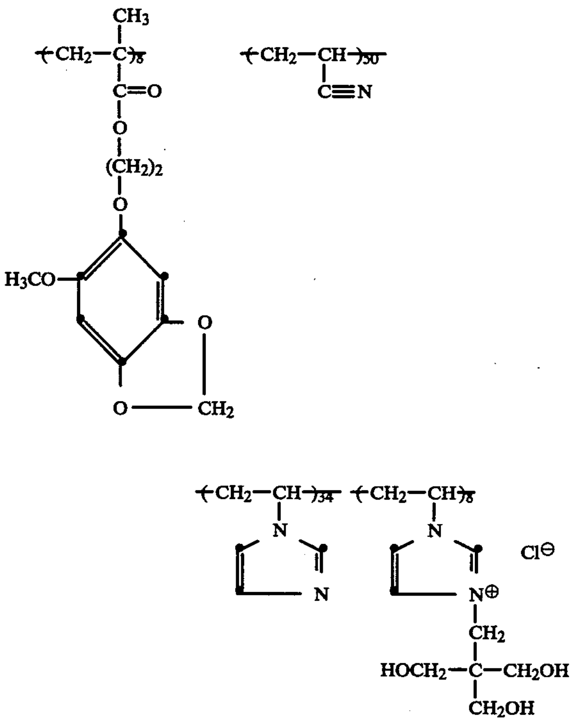

Compound 16

Poly[styrene-co-methacrylonitrile-co-1-vinylimidazole-co-3-(2,3-dihydroxypropyl)-1-vinylimidazolium chloride] (mole ratio 10:50:32:8)

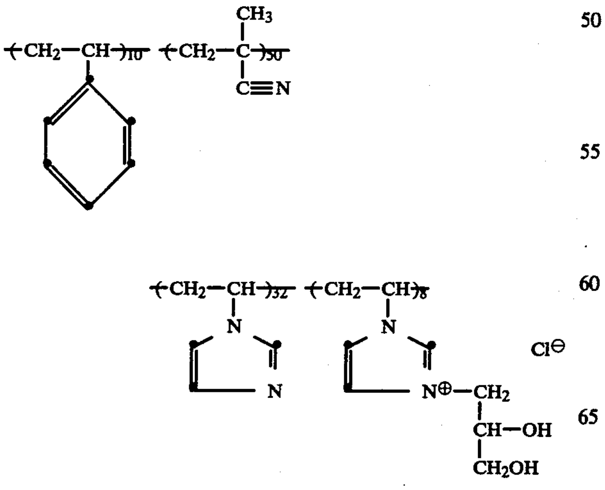

Compound 17

Poly[methacrylonitrile-co-2-methyl-1-vinylimidazole-co-2-methyl-3-(2-hydroxyethyl)-1-vinylimidazolium chloride] (mole ratio 45:49:6)

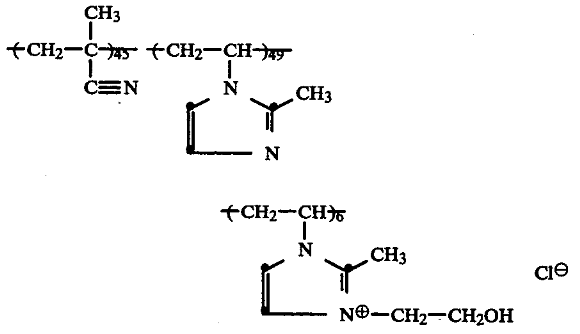

Compound 18

Poly[methacrylonitrile-co-1-vinylimidazole-co-3-(2,3,4,5,6-pentahydroxyhexyl)-1-vinylimidazolium chloride] (mole ratio 40:52:8)

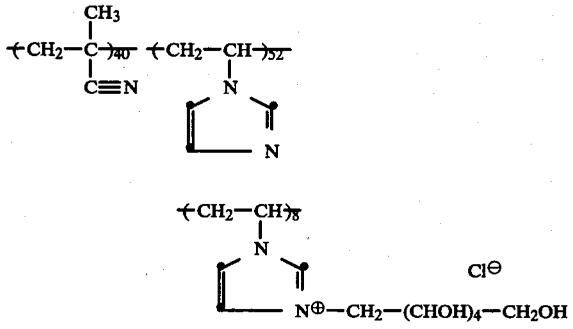

Compound 19 Poly[2,3,4,5,6-pentahydroxyhexyl acrylate-co-acrylonitrile-co-1-vinylimidazole-co-3-(2,3-dihydroxypropyl)-1-vinylimidazolium chloride] (mole ratio 10:37:45:8)

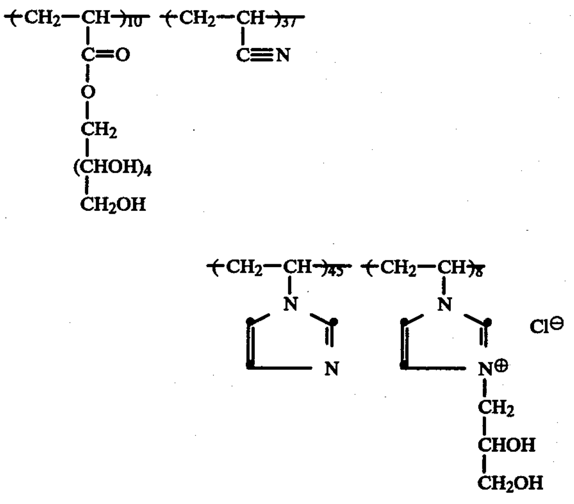

Compound 20

Poly{3,4-methylenedioxystyrene-co-acrylonitrile-co-1-vinylimidazole-co-3-[3-(2,4,5-trimethoxyphenoxy)-2-hydroxypropyl]-1-vinylimidazolium propionate] (mole ratio 10:50:32:8)

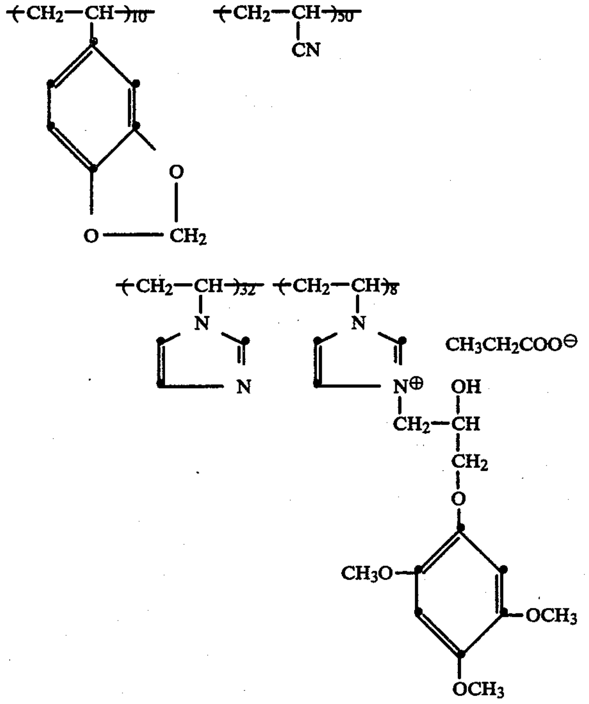

The photographic element described above can be treated in any manner with an alkaline processing composition to effect or initiate development. A preferred method for applying processing composition is by use of a rupturable container or pod which contains the composition. In general, the processing composition employed in this invention contains the developing agent for development, although the composition could also just be an alkaline solution where the developer is incorporated in the photographic element, image-receiving element or process sheet, in which case the alkaline solution serves to activate the incorporated developer.

A photographic assemblage in accordance with this invention is adapted to be processed by an alkaline processing composition, and comprises:

(1) a photographic element as described above; and (2) a dye image-receiving layer.

In this embodiment, the processing composition may be inserted into the assemblage, such as by interjecting processing solution with communicating members similar to hypodermic syringes which are attached either to a camera or camera cartridge. The processing composition can also be applied by means of a swab or by dipping in a bath, if so desired. Another method of applying processing composition to a film assemblage which can be used in our invention is the liquid spreading means described in U.S. Pat. No. 4,370,407 of Columbus, issued Jan. 25, 1983.

In a preferred embodiment of the invention, the assemblage itself contains the alkaline processing composition and means containing same for discharge within the film unit. There can be employed, for example, a rupturable container which is adapted to be positioned so that during processing of the film unit, a compressive force applied to the container by pressure-applying members, such as would be found in a camera designed for in-camera processing, will effect a discharge of the container's contents within the film unit.

The dye image-providing material useful in this invention is either positive- or negative-working, and is either initially mobile or immobile in the photographic element during processing with an alkaline composition. Examples of initially mobile, positive-working dye image-providing materials useful in this invention are described in U.S. Pat. Nos. 2,983,606; 3,536,739; 3,705,184; 3,482,972; 2,756,142; 3,880,658 and 3,854,985. Examples of negative-working dye image-providing materials useful in this invention include conventional couplers which react with oxidized aromatic primary amino color developing agents to produce or release a dye such as those described, for example, in U.S. Pat. No. 3,227,550 and Canadian Pat. No. 602,607. In a preferred embodiment of this invention, the dye image-providing material is a ballasted, redox-dye-releasing (RDR) compound. Such compounds are well known to those skilled in the art and are, generally speaking, compounds which will react with oxidized or unoxidized developing agent or electron transfer agent to release a dye. Such nondiffusible RDR's include negative-working compounds, as described in U.S. Pat. Nos. 3,728,113 of Becker et al.; 3,725,062 of Anderson and Lum; 3,698,897 of Gompf and Lum; 3,628,952 of Puschel et al.; 3,443,939 and 3,443,940 of Bloom et al.; 4,053,312 of Fleckenstein; 4,076,529 of Fleckenstein et al.; 4,055,428 of Koyama et al.; 4,149,892 of Deguchi et al.; 4,198,235 and 4,179,291 of Vetter et al.; *Research Disclosure* 15157, November, 1976 and *Research Disclosure* 15654, April, 1977.

Such nondiffusible RDR's also include positive-working compounds, as described in U.S. Pat. Nos. 3,980,479; 4,139,379; 4,139,389; 4,199,354, 4,232,107, 4,199,355 and German Pat. No. 2,854,946, the disclosures of which are hereby incorporated by reference.

In a preferred embodiment of the invention, RDR's such as those in the Fleckenstein et al. patent referred to above are employed. Such compounds are ballasted sulfonamido compounds which are alkalicleavable upon oxidation to release a diffusible dye from the nucleus and have the formula:

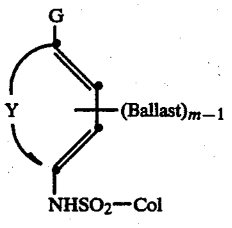

wherein:

(a) Col is a dye or dye precursor moiety;

(b) Ballast is an organic ballasting radical of such molecular size and configuration (e.g., simple organic groups or polymeric groups) as to render the compound nondiffusible in the photosensitive element during development in an alkaline processing composition;

(c) G is $OR^6$ or $NHR^7$ wherein $R^6$ is hydrogen or a hydrolyzable moiety and $R^7$ is hydrogen or a substituted or unsubstituted alkyl group of 1 to 22 carbon atoms, such as methyl, ethyl, hydroxyethyl, propyl, butyl, secondary butyl, tertiary butyl, cyclopropyl, 4-chlorobutyl, cyclobutyl, 4-nitroamyl, hexyl, cyclohexyl, octyl, decyl, octadecyl, docosyl, benzyl or phenethyl (when $R^7$ is an alkyl group of greater than 6 carbon atoms, it can serve as a partial or sole Ballast group);

(d) Y represents the atoms necessary to complete a benzene nucleus, a naphthalene nucleus or a 5- to 7-membered heterocyclic ring such as pyrazolone or pyrimidine; and (e) m is a positive integer or 1 to 2 and is 2 when G is $OR^6$ or when $R^7$ is a hydrogen or an alkyl group of less than 8 carbon atoms.

For further details concerning the abovedescribed sulfonamido compounds and specific examples of same, reference is made to the above-mentioned Fleckenstein et al. U.S. Pat. No. 4,076,529.

In another preferred embodiment of the invention, positive-working, nondiffusible RDR's of the type disclosed in U.S. Pat. Nos. 4,139,379 and 4,139,389 are employed. In this embodiment, an immobile compound is employed which as incorporated in a photographic element is incapable of releasing a diffusible dye. However, during photographic processing under alkaline conditions, the compound is capable of accepting at least one electron (i.e., being reduced) and thereafter releases a diffusible dye. These immobile compounds are ballasted electron accepting nucleophilic displacement compounds.

The dye image-receiving layer in the above-described film assemblage is optionally located on a separate support adapted to be superposed on the photographic element after exposure thereof. Such image-receiving elements are generally disclosed, for example, in U.S. Pat. No. 3,362,819.

When the means for discharging the processing composition is a rupturable container, it is usually positioned in relation to the photographic element and the image-receiving element described above so that a compressive force applied to the container by pressure-applying members, such as would be found in a typical camera used for in-camera processing, will effect a discharge of the container's contents between the image-receiving element and the outermost layer of the photographic element. After processing, the dye image-receiving element is separated from the photographic element.

In another embodiment, the dye image-receiving layer in the above-described film assemblage is integral with the photographic element and is located between the support and the lowermost photosensitive silver halide emulsion layer. One useful format for integral negative-receiver photographic elements is disclosed in Belgian Pat. No. 757,960. In such an embodiment, the support for the photographic element is transparent and is coated with a dye image-receiving layer as described above, a substantially opaque light-reflective layer, e.g., $TiO_2$, and then the photosensitive layer or layers described above. After exposure of the photographic element, a rupturable container containing an alkaline processing composition and an opaque process sheet are brought into superposed position. Pressure-applying members in the camera rupture the container and spread processing composition over the photographic element as the film unit is withdrawn from the camera. The processing composition develops each exposed silver halide emulsion layer, and dye images, formed as a function of development, diffuse to the image-receiving layer to provide a positive, right-reading image which is viewed through the transparent support on the opaque reflecting layer background. For other details concerning the format of this particular integral film unit, reference is made to the above-mentioned Belgian Pat. No. 757,960.

Another format for integral negative-receiver photographic elements in which the present invention is useful is disclosed in Canadian Pat. No. 928,559. In this embodiment, the support for the photographic element is transparent and is coated with the dye image-receiving layer described above, a substantially opaque, light-reflective layer and the photosensitive layer or layers described above. A rupturable container, containing an alkaline processing composition and an opacifier, is positioned between the top layer and a transparent cover sheet which has thereon, in sequence, a neutralizing layer, and a timing layer. The film unit is placed in a camera, exposed through the transparent cover sheet and then passed through a pair of pressure-applying members in the camera as it is being removed therefrom. The pressure-applying members rupture the container and spread processing composition and opacifier over the negative portion of the film unit to render it light-insensitive. The processing composition develops each silver halide layer and dye images, formed as a result of development, diffuse to the image-receiving layer to provide a positive, right-reading image which is viewed through the transparent support on the opaque reflecting layer background. For further details concerning the format of this particular integral film unit, reference is made to the above-mentioned Canadian Pat. No. 928,559.

Still other useful integral formats in which this invention can be employed are described in U.S. Pat. Nos. 3,415,644; 3,415,645; 3,415,646; 3,647,437 and 3,635,707. In most of these formats, a photosensitive silver halide emulsion is coated on an opaque support and a dye image-receiving layer is located on a separate transparent support superposed over the layer outermost from the opaque support. In addition, this transparent support also contains a neutralizing layer and a timing layer underneath the dye image-receiving layer.

In another embodiment of the invention, a neutralizing layer and timing layer are located underneath the photosensitive layer or layers. In that embodiment, the photographic element would comprise a support having thereon, in sequence, a neutralizing layer, a timing layer and at least one photosensitive silver halide emulsion layer having associated therewith a dye image-providing material. A dye image-receiving layer as described above would be provided on a second support with the processing composition being applied therebetween. This format could either be integral or peel-apart as described above.

Another embodiment of the invention uses the image-reversing technique disclosed in British Pat. No. 904,364, page 19, lines 1 through 41. In this process, the dye-releasing compounds are used in combination with physical development nuclei in a nuclei layer contiguous to the photosensitive silver halide negative emulsion layer. The film unit contains a silver halide solvent, preferably in a rupturable container with the alkaline processing composition.

A process for producing a photographic transfer image in color according to the invention from an imagewise-exposed photosensitive element comprising a support having thereon at least one photosensitive silver halide emulsion layer having associated therewith a dye image-providing material, comprises treating the element with an alkaline processing composition in the presence of a silver halide developing agent to effect development of each of the exposed silver halide emulsion layers. An imagewise distribution of dye image-providing material is formed as a function of development and at least a portion of it diffuses to a dye image-receiving layer to provide the transfer image.

The film unit or assemblage of the present invention is used to produce positive images in single or multicolors. In a three-color system, each silver halide emulsion layer of the film assembly will have associated therewith a dye image-providing material which possesses a predominant spectral absorption within the region of the visible spectrum to which said silver halide emulsion is sensitive, i.e., the blue-sensitive silver halide emulsion layer will have a yellow dye image-providing material associated therewith, the green-sensitive silver halide emulsion layer will have a magenta dye image-providing material associated therewith and the red-sensitive silver halide emulsion layer will have a cyan dye image-providing material associated therewith. The dye image-providing material associated with each silver halide emulsion layer is contained either in the silver halide emulsion layer itself or in a layer contiguous to the silver halide emulsion layer, i.e., the dye image-providing material can be coated in a separate layer underneath the silver halide emulsion layer with respect to the exposure direction.

The concentration of the dye image-providing material that is employed in the present invention can be varied over a wide range, depending upon the particular compound employed and the results desired. For example, the dye image-providing material coated in a layer at a concentration of 0.1 to 3 $g/m^2$ has been found to be useful. The dye image-providing material is usually dispersed in a hydrophilic film forming natural material or synthetic polymer, such as gelatin, polyvinyl alcohol, etc, which is adapted to be permeated by aqueous alkaline processing composition.

A variety of silver halide developing agents are useful in this invention. Specific examples of developers or electron transfer agents (ETA's) useful in this invention include hydroquinone compounds, aminophenol compounds, catechol compounds, 3-pyrazolidinone compounds, such as those disclosed in column 16 of U.S. Pat. No. 4,358,527, issued Nov. 9, 1982. A combination of different ETA's, such as those disclosed in U.S. Pat. No. 3,039,869, can also be employed. These ETA's are employed in the liquid processing composition or contained, at least in part, in any layer or layers of the photographic element or film assemblage to be activated by the alkaline processing composition, such as in the silver halide emulsion layers, the dye image-providing material layers, interlayers, image-receiving layer, etc.

In the invention, dye image-providing materials can be used which produce diffusible dye images as a function of development. Either conventional negative-working or direct-positive silver halide emulsions are employed. If the silver halide emulsion employed is a direct-positive silver halide emulsion, such as an internal image emulsion designed for use in the internal image reversal process, or a fogged, direct-positive emulsion such as a solarizing emulsion, which is developable in unexposed areas, a positive image can be obtained on the dye image-receiving layer by using negative-working ballasted, redox dye-releasers. After exposure of the film assemblage or unit, the alkaline processing composition permeates the various layers to initiate development of the exposed photosensitive silver halide emulsion layers. The developing agent present in the film unit develops each of the silver halide emulsion layers in the unexposed areas (since the silver halide emulsions are direct-positive ones), thus causing the developing agent to become oxidized imagewise corresponding to the unexposed areas of the direct-positive silver halide emulsion layers. The oxidized developing agent then cross-oxidizes the dye-releasing compounds and the oxidized form of the compounds then undergoes a base-initiated reaction to release the dyes imagewise as a function of the imagewise exposure of each of the silver halide emulsion layers. At least a portion of the imagewise distributions of diffusible dyes diffuse to the image-receiving layer to form a positive image of the original subject. After being contacted by the alkaline processing composition, a neutralizing layer in the film unit or image-receiving unit lowers the pH of the film unit or image receiver to stabilize the image.

Internal image silver halide emulsions useful in this invention are described more fully in the November, 1976 edition of *Research Disclosure*, pages 76 through 79, the disclosure of which is hereby incorporated by reference.

The various silver halide emulsion layers of a color film assembly employed in this invention can be disposed in the usual order, i.e., the blue-sensitive silver halide emulsion layer first with respect to the exposure side, followed by the green-sensitive and red-sensitive silver halide emulsion layers. If desired, a yellow dye layer or a yellow colloidal silver layer can be present between the blue-sensitive and green-sensitive silver halide emulsion layers for absorbing or filtering blue radiation that is transmitted through the blue-sensitive layer. If desired, the selectively sensitized silver halide emulsion layers can be disposed in a different order, e.g., the blue-sensitive layer first with respect to the exposure side, followed by the red-sensitive and green-sensitive layers.

The rupturable container employed in certain embodiments of this invention is disclosed in U.S. Pat. Nos. 2,543,181; 2,643,886; 2,653,732; 2,723,051; 3,056,492; 3,056,491 and 3,152,515. In general, such containers comprise a rectangular sheet of fluid- and air-impervious material folded longitudinally upon itself to form two walls which are sealed to one another along their longitudinal and end margins to form a cavity in which processing solution is contained.

Generally speaking, except where noted otherwise, the silver halide emulsion layers employed in the invention comprise photosensitive silver halide dispersed in gelatin and are about 0.6 to 6 microns in thickness; the dye image-providing materials are dispersed in an aqueous alkaline solution-permeable polymeric binder, such as gelatin, as a separate layer about 0.2 to 7 microns in thickness; and the alkaline solution-permeable polymeric interlayers, e.g., gelatin, are about 0.2 to 5 microns in thickness. Of course, these thicknesses are approximate only and can be modified according to the product desired.

Scavengers for oxidized developing agent can be employed in various interlayers of the photographic elements of the invention. Suitable materials are disclosed on page 83 of the November 1976 edition of *Research Disclosure,* the disclosure of which is hereby incorporated by reference.

The dye image-receiving layers containing the novel mordants of this invention may also contain a polymeric vehicle as long as it is compatible therewith. Suitable materials are disclosed, for example, in U.S. Pat. No. 3,958,995, and in *Product Licensing Index,* 92, December, 1971, Publ. No. 9232; page 108, paragraph VIII, the disclosures of which are hereby incorporated by reference.

Use of a neutralizing material in the film units employed in this invention will usually increase the stability of the transferred image. Generally, the neutralizing material will effect a reduction in the pH of the image layer from about 13 or 14 to at least 11 and preferably 5 to 8 within a short time after imbibition. Suitable materials and their functioning are disclosed on pages 22 and 23 of the July 1974 edition of *Research Disclosure,* and pages 35 through 37 of the July 1975 edition of *Research Disclosure,* the disclosures of which are hereby incorporated by reference.

A timing or inert spacer layer can be employed in the practice of this invention over the neutralizing layer which "times" or controls the pH reduction as a function of the rate at which alkali diffuses through the inert spacer layer. Examples of such timing layers and their functioning are disclosed in the *Research Disclosure* articles mentioned in the paragraph above concerning neutralizing layers.

The alkaline processing composition employed in this invention is the conventional aqueous solution of an alkaline material, e.g., alkali metal hydroxides or carbonates such as sodium hydroxide, sodium carbonate or an amine such as diethylamine, preferably possessing a pH in excess of 11, and preferably containing a developing agent as described previously. Suitable materials and addenda frequently added to such compositions are disclosed on pages 79 and 80 of the November, 1976 edition of *Research Disclosure,* the disclosure of which is hereby incorporated by reference.

The alkaline solution permeable, substantially opaque, light-reflective layer employed in certain embodiments of photographic film units used in this invention is described more fully in the November, 1976 edition of *Research Disclosure,* page 82, the disclosure of which is hereby incorporated by reference.

The supports for the photographic elements used in this invention can be any material, as long as it does not deleteriously affect the photographic properties of the film unit and is dimensionally stable. Typical flexible sheet materials are described on page 85 of the November, 1976 edition of *Research Disclosure,* the disclosure of which is hereby incorporated by reference.

While the invention has been described with reference to layers of silver halide emulsions and dye image-providing materials, dotwise coating, such as would be obtained using a gravure printing technique, could also be employed. In this technique, small dots of blue-, green- and red-sensitive emulsions have associated therewith, respectively, dots of yellow, magenta and cyan color-providing substances. After development, the transferred dyes would tend to fuse together into a continuous tone. In an alternative embodiment, the emulsions sensitive to each of the three primary regions of the spectrum can be disposed as a single segmented layer, e.g., as by the use of microvessels, as described in Whitmore U.S. Pat. No. 4,362,806, issued Dec. 7, 1982.

The silver halide emulsions useful in this invention, both negative-working and direct-positive ones, are well known to those skilled in the art and are described in *Research Disclosure,* Volume 176, December, 1978, Item 17643, pages 22 and 23, "Emulsion preparation and types"; they are usually chemically and spectrally sensitized as described on page 23, "Chemical sensitization", and "Spectral sensitization and desensitization", of the above article; they are optionally protected against the production of fog and stabilized against loss of sensitivity during keeping by employing the materials described on pages 24 and 25, "Antifoggants and stabilizers", of the above article; they usually contain hardeners and coating aids as described on page 26, "Hardeners", and pages 26 and 27, "Coating aids", of the above article; they and other layers in the photographic elements used in this invention usually contain plasticizers, vehicles and filter dyes described on page 27, "Plasticizers and lubricants"; page 26, "Vehicles and vehicle extenders"; and pages 25 and 26, "Absorbing and scattering materials", of the above article; they and other layers in the photographic elements used in this invention can contain addenda which are incorporated by using the procedures described on page 27, "Methods of addition", of the above article; and they are usually coated and dried by using the various techniques described on pages 27 and 28, "Coating and drying procedures", of the above article, the disclosures of which are hereby incorporated by reference. *Research Disclosure* and *Product Licensing Index* are publications of Industrial Opportunities Ltd.; Homewell, Havant; Hampshire, P09 1EF, United Kingdom.

The term "nondiffusing" used herein has the meaning commonly applied to the term in photography and denotes materials that for all practical purposes do not migrate or wander through organic colloid layers, such as gelatin, in the photographic elements of the invention in an alkaline medium and preferably when processed in a medium having a pH of 11 or greater. The same meaning is to be attached to the term "immobile". The term "diffusible" as applied to the materials of this invention has the converse meaning and denotes materials having the property of diffusing effectively through the colloid layers of the photographic elements in an alkaline medium. "Mobile" has the same meaning as "diffusible".

The term "associated therewith" as used herein is intended to mean that the materials can be in either the same or different layers, so long as the materials are accessible to one another.

The following examples are provided to further illustrate the invention.

Example 1—Preparation of Compound 3

The basic polymer before quaternization may be made by conventional batch, semicontinuous, or continuous polymerization techniques. However, continuous polymerization techniques as described in *Research Disclosure,* Vol. 191, March 1980, Item 19109, are preferred. A single or mixture of free radical generating initiator(s) may be used at temperatures ranging from 50° to 150° C., preferably 60°–90° C.

The imidazole component of the formed polymer may conveniently be partially quaternized in solution just prior to coating; Compound 3 was prepared in this manner. A solution containing 2.5 g poly(acrylonitrile-co-1-vinylimidazole) (54:46 mole ratio) and 3 ml propionic acid in 40 ml distilled water was heated to 43° C. To this solution was added 0.25 g of p-methoxyphenyl glycidyl ether dissolved in 10 ml methanol. The heated mixture was stirred for 10 minutes. Just prior to coating, 30 ml of a 10 percent gelatin solution was added. The preparation is believed to produce a polymer of 10 weight percent or 4 mole percent 3-(4-methoxyphenoxy)-2-hydroxypropyl quaternization with a propionate anion.

Example 2—Preparation of Compound 6 Poly[3,4-methylenedioxystyrene-co-acrylonitrile-co-1-vinylimidazole-co-3-(2-hydroxyethyl)-1-vinylimidazolium chloride] (mole ratio 8:48:39:5)

Two reactors are charged with 0.5 liter each of N,N-dimethylformamide (DMF) and deoxygenated by bubbling pure nitrogen under the surface for approximately thirty minutes. The temperature of the reactor contents is maintained at 75° C.

An initiator solution is prepared by deoxygenating 10.6 kg of DMF for 0.75 hour using a pure nitrogen sparge. To 6.02 kg of the deoxygenated DMF, 49.65 g of 2,2'-azobis(2,4-dimethylvaleronitrile) sold by duPont as VAZO 52 and 33.1 g of 2,2'-azobis(2-methylpropionitrile) sold by duPont as VAZO 64 are added with stirring. Then to 4.5 kg DMF, 14.2 g of each, VAZO 52 and VAZO 64, are added with stirring. Each of these solutions is put into separate header tanks.

645 g of 3,4-Methylenedioxystyrene, 1393 g of acrylonitrile, and 2262 g of 1-vinylimidazole (freshly distilled) are mixed and deoxygenated by bubbling pure nitrogen under the surface for 0.5 hour. This mixture is then put into a cooled monomer head tank and kept cool for the duration of the run.

The monomers are pumped into reactor 1 at a rate of 1.14 ml/min, and the first and second initiator solutions are pumped into reactors 1 and 2, respectively, at a rate of 1.49 ml/min. The contents of reactor 1 are fed to reactor 2 and the residence volume for each reactor is 0.5 liter and the residence times are 3.4 hours and 2.4 hours for reactors 1 and 2, respectively. The theoretical solids are 43.3% and 30.7% for reactors 1 and 2, respectively.

For the first 14.4 hours the material collected must be discarded. After 14.4 hours the steady state material is collected in a 5 gallon plastic bucket. The overall yield of polymer throughout the 50.1 hours of steady state is 10.52 kg of a 30.5% solution which is equivalent to a 96% yield.

Quaternization, Acidification and Diafiltration of the Polymer

To a five gallon glass-lined, jacketed reactor is added 8531 g of polymer solution at 31% solids. This solution is deoxygenated by bubbling nitrogen into the solution for one hour and further degassing under vacuum four times. 180 g of 2-Chloroethanol is then added through the condenser at room temperature with stirring. This is enough 2-chloroethanol to give a 5%-5.5% quat. The temperature is then raised to 95° C. for sixteen hours. After sixteen hours, the reactor is cooled and the product is collected in a five gallon plastic bucket. A small sample is isolated in acetone for analysis. The Tg is 144° C. (range 122°-156° C.), the inherent viscosity of the quaternized polymer as measured at 0.25 g/dl (DMF) at 25° C. using a Cannon-Fenske viscometer is 0.31. A nonaqueous titration performed for imidazole and quaternized imidazole shows 39.5 wt.% and 11.7 wt.%, respectively.

The resultant solution is then acidified (pH 5.2) with 550 g of glacial acetic acid plus four kg of distilled water. This solution is added to 43 kg to reduce the solids to 5% and the mixture is diafiltered using polysulfone permeator.

Example 3—Photographic Test

A multicolor, photosensitive donor element of the peel-apart type was prepared by coating the following layers in the order recited on an opaque poly(ethylene terephthalate) film support. Coverages are parenthetically given in g/m$^2$.

(1) Polymeric acid layer of poly(n-butyl acrylate-co-acrylic acid) at a 30:70 weight ratio equivalent to 81 meq. acid/m$^2$;
(2) Interlayer of poly(ethyl acrylate-co-acrylic acid/(80:20 wt. ratio) coated from a latex (0.54);
(3) Timing layer of a 1:9 physical mixture of poly(acrylonitrile-co-vinylidene chloride-co-acrylic acid) (weight ratio 14:79:7) and the carboxyester-lactone formed by cyclization of a vinyl acetate-maleic anhydride copolymer in the presence of 1-butanol to produce a partial butyl ester (ratio of acid:ester of 15:85) (4.8);
(4) A "gel-nitrate" layer (0.22) of bone gelatin and cellulose nitrate in a compatible solvent mixture of water, methanol and acetone (See Glafkides, "Photographic Chemistry", Vol. 1, Engl. Ed., page 468 (1958);
(5) Cyan RDR (0.47), and gelatin (1.5);
(6) Red-sensitive, negative silver chloride emulsion (0.29 Ag) and gelatin (0.62);
(7) Interlayer of 2,5-didodecylhydroquinone (0.54), gelatin (1.2) and ETA (0.48);
(8) Magenta RDR (0.48) and gelatin (1.0);
(9) Green-sensitive, negative silver chloride emulsion (0.51 Ag) and gelatin (0.90);
(10) Interlayer of 2,5-didodecylhydroquinone (0.54) gelatin (1.2) and ETA (0.48);
(11) Yellow RDR (0.68), and gelatin (1.2);
(12) Blue-sensitive, negative silver chloride emulsion layer (0.42 Ag) and gelatin (0.82);
(13) Interlayer of poly[styrene-co-1-vinylimidazole-co-3-(2-hydroxyethyl)-1-vinylimidazolium chloride] (50:40:10 wt. ratio) (0.11) in gelatin (0.81); and
(14) Overcoat layer of gelatin (0.89).

Cyan RDR

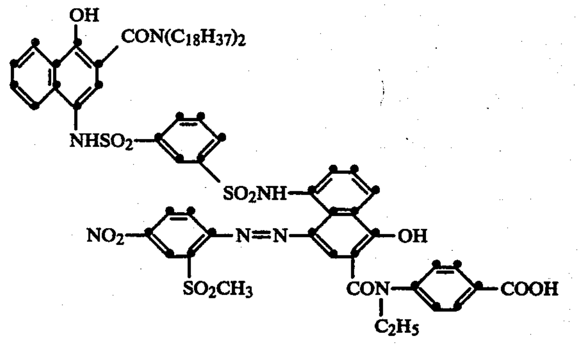

Dispersed in tritolyl phosphate (RDR:solvent 1:1)

Magenta RDR

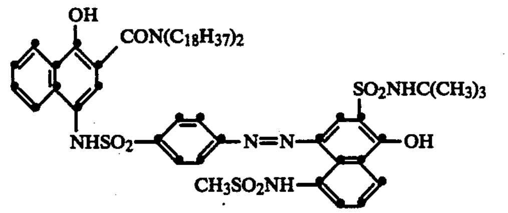

Dispersed in N,N-butylacetanilide (RDR:solvent 1:2)

Yellow RDR

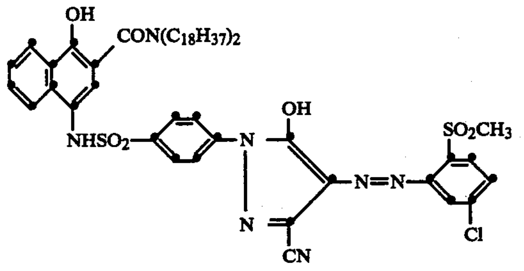

Dispersed in di-n-butyl phthalate (RDR:solvent 2:1)

ETA

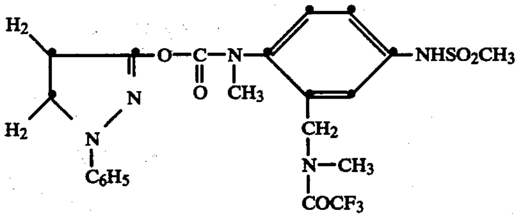

A. A control receiving element was prepared by coating the mordant poly(1-vinylimidazole) (3.0 g/m$^2$) and gelatin (3.0 g/m$^2$), hardened with 1.25 percent formaldehyde, on a polyethylene-coated paper support which had a 0.7 g/m$^2$ gelatin underlayer.

B. A control receiving element similar to A was prepared except that the mordant was poly[1-vinylimidazole-co-3-(2-hydroxyethyl)-1-vinylimidazolium chloride] (mole ratio 90:10).

C. A control element similar to A was prepared except that the mordant was poly(1-vinylimidazole-co-3-benzyl-1-vinylimidazolium chloride) (mole ratio 90:10).

D. A control element similar to A was prepared except that the mordant was poly(styrene-co-1-vinylimidazole) (mole ratio 50:50).

E. A control element similar to A was prepared except that the mordant was poly[styrene-co-1-vinylimidazole-co-3-(2-hydroxyethyl)-1-vinylimidazolium chloride) (mole ratio 50:40:10).

F. A control element similar to A was prepared except that the mordant was poly[styrene-co-1-vinylimidazole-co-3-benzyl-1-vinylimidazolium chloride) (mole ratio 50:40:10).

G. A control element similar to A was prepared except that the mordant was poly(acrylonitrile-co-1-vinylimidazole) (mole ratio 54:46).

H. A receiving element according to the invention was prepared similar to A except that the mordant was compound 1.

I. A receiving element according to the invention was prepared similar to A except that the mordant was compound 2.

An activator solution was prepared as follows:

| | |
|---|---|
| Potassium hydroxide | 0.6 N |
| 5-Methylbenzotriazole | 3.0 g/l |
| 11-Aminoundecanoic acid | 2.0 g/l |
| Potassium bromide | 2.0 g/l |
| Potassium sulfite | 8.0 g/l |

A sample of the donor element was exposed in a sensitometer through a graduated density step tablet to yield a near neutral at a Status A density of 0.8, soaked in the activator solution described above in a shallow-tray processor for 15 seconds at 28° C. (82.5° F.) and then laminated between nip rollers to each of the receiving elements described above. After ten minutes at room temperature, 22° C. (72° F.), the donor and receiver were peeled apart.

The Status A red, green and blue density curves were obtained by a computer integration of the individual step densities on the receiver. The receiver was then incubated under "HID fade" conditions, (2 weeks, 50 κLux measured at the surface, 35° C., 53 percent RH with the sample surface-covered with a Wratten 2B filter) and the curves were again obtained. The loss in density, ΔD, from an original density of 1.6 was calculated.

For the evaluation of image sharpness, another multicolor donor was exposed in a sensitometer through a parallel-line resolution test chart. The exposure was adjusted to provide a Status A neutral density of approximately 1.8. The exposed donor was soaked in the activator solution described above in a shallow-tray processor for 15 seconds at 28° C. (82.5° F.) and ten laminated between nip-rollers to a sample of the receiving elements described above. After 10 minutes at room temperature, the donor and receiver were separated.

The highest resolution of the test chart image on the "fresh" transfer for which discrete lines were distinguishable (as lines/mm) was determined by visual observation using a 10X magnifier. The receiver was then hung in a sealed chamber containing an open reservoir of hot (ca. 70° C.) water for 13 hours (this was to provide 100 percent RH in the chamber, the temperature of the water was allowed to gradually decrease to room temperature over this time). The resolution of the test object was again visually evaluated and compared to the original to estimate the relative image smear. A receiver having high resolution both initially and after incubation would have no image smear and would be highly desirable. Thus, the higher the resolution number after incubation, the better the mordant is. (Note: these test conditions are useful to compare image sharpness only in a relative sense; both this sharpness test and the dye-light stability test represent severe accelerated testing designed to detect differences). The following results were obtained:

TABLE 1

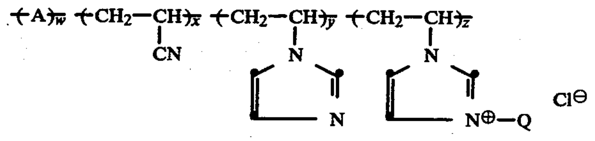

| Re-ceiver | Mor-dant | A | Q | w:x:y:z (mole %) | $D_{max}/D_{min}$ R | G | B | Dye Loss Upon Incubation ΔD R | G | B | Resolu-tion Test Initial/ Incubated (lines/ mm) |
|---|---|---|---|---|---|---|---|---|---|---|---|
| A | C-1 | — | — | 0:0:100:0 | 3.0/ 0.14 | 2.7/ 0.15 | 2.7 0.18 | 0.19 | 0.16 | 0.16 | 11/0 |
| B | C-2 | — | $-CH_2-CH_2OH$ | 0:0:90:10 | 3.0/ 0.13 | 2.7/ 0.13 | 2.7/ 0.16 | 0.24 | 0.23 | 0.18 | 13/0 |
| C | C-3 | — | $-CH_2-C_6H_5$ | 0:0:90:10 | 3.0/ 0.13 | 2.7/ 0.13 | 2.7/ 0.16 | 0.33 | 0.41 | 0.21 | 13/6 |
| D | C-4 | polym. styrene | — | 50:0:50:0 | 2.5/ 0.10 | 2.4/ 0.11 | 2.3/ 0.11 | 0.30 | 0.39 | 0.19 | 11/8 |
| E | C-5 | polym. styrene | $-CH_2-CH_2OH$ | 50:0:40:10 | 2.9/ 0.16 | 2.7/ 0.12 | 2.0/ 0.16 | 0.38 | 0.51 | 0.31 | 14/13 |
| F | C-6 | polym. styrene | $-CH_2-C_6H_5$ | 50:0:40:10 | 2.9/ 0.15 | 2.6/ 0.12 | 2.6 0.16 | 0.46 0.46 | 0.61 0.61 | 0.34 0.34 | 14/14 14/14 |
| G | C-7 | — | — | 0:54:46:0 | 2.7/ 0.11 | 2.5/ 0.09 | 2.4/ 0.13 | 0.23 | 0.23 | 0.17 | 11/6 |
| H | Cmpd 1 | — | $-CH_2-CH_2OH$ | 0:56:40:4 | 2.9/ 0.13 | 2.6/ 0.11 | 2.6/ 0.16 | 0.19 | 0.20 | 0.15 | 14/8 |
| I | Cmpd 2 | — | $-CH_2-CH_2OH$ | 0:82:15:3 | 2.7/ 0.13 | 2.5/ 0.11 | 2.5/ 0.16 | 0.20 | 0.20 | 0.17 | 13/11 |

The above results indicate that control receiving elements A and B had relatively good dye-light stability, but the image smear as measured by the resolution test was very severe (going from 11 and 13 to 0). In control receiver element C, partial benzyl chloride quaternization of the poly(1-vinylimidazole) improved image sharpness somewhat (going from 0 to 6 after incubation), but this was at the expense of dye-light stability.

In control receiver D, the image smear was good, but again, this was at the expense of dye-light stability. The $D_{max}$'s also tended to be low.

In control receiver E and F, partial quaternization with either chloroethanol or benzyl chloride produced mordants with good initial image sharpness which did not smear under conditions of high humidity. These mordants, however, had inferior dye-light stability.

In control receiver G, the dye-light stability was good, but the image sharpness was only fair.

The receiving elements containing the mordants of the invention had both good or excellent image sharpness and excellent dye-light stability.

Example 4—Photographic Test

J. A receiving element according to the invention was prepared similar to A in Example 3 except that the mordant was Compound 3.

A sample of receiving element G in Example 3 was used as the control.

Processing was the same as in Example 3 along with an additional fluorescent light fade test. These fade test conditions were for 6 weeks, 5.4 kLux cool-white fluorescent, 22° C. and 84% RH. The loss in density, ΔD, from an original density of 1.6 was calculated. The following results were obtained:

TABLE 2

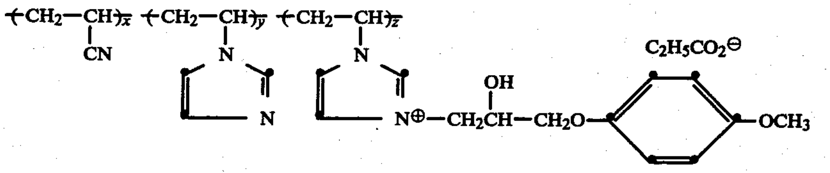

| Re-ceiver | Mor-dant | x:y:z | $D_{max}/D_{min}$ R | G | B | Dye Loss Upon Incubation ΔD R | G | B | Fluorescent Dye Loss Upon Incubation ΔD R | G | B | Resolu-tion Test Initial/ Incubated (lines/ mm) |
|---|---|---|---|---|---|---|---|---|---|---|---|---|
| G | C-7 | 54:46:0 | 2.6/ 0.09 | 2.3/ 0.09 | 2.4/ 0.11 | 0.22 | 0.26 | 0.23 | 0.25 | 0.15 | 0.12 | 11/6 |
| J | Cmpd 3 | 56:37:7 | 2.9/ 0.11 | 2.6/ 0.10 | 2.7/ 0.16 | 0.23 | 0.28 | 0.23 | 0.13 | 0.09 | 0.11 | 14/13 |

The above results indicate that the receiver containing a mordant according to the invention had superior initial sharpness and lost very little under high humidity incubation conditions. It also had improved dye-light stability at high humidity fluorescent testing, and retained acceptable dye-light stability under high intensity testing conditions as compared to the control receiver with no quarternized component in the mordant.

Example 5—Photographic Test

K. A control receiving element was prepared similar to A in Example 3 except that the mordant was poly(acrylonitrile-co-1-vinylimidazole) (mole ratio 65:35).

L. A control receiving element was prepared similar to A in Example 3 except that the mordant was poly[acrylonitrile-co-1-vinylimidazole-co-3-(2,3-dihydroxypropyl)-1-vinylimidazolium chloride] (mole ratio 66:24:10).

M. A control element was prepared similar to L) except that the mole ratio was 67:19:14.

N. A receiving element according to the invention was prepared similar to A in Example 3 except that the mordant was Compound 4.

O. A receiving element according to the invention was prepared similar to A in Example 3 except that the mordant was Compound 5.

P. A receiving element according to the invention was prepared similar to A in Example 3 except that the mordant was Compound 6.

Q. A receiving element according to the invention was prepared similar to A in Example 3 except that the mordant was Compound 7.

Processing was the same as in Example 3 with the following results:

TABLE 3

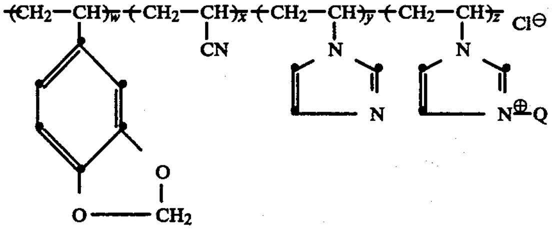

| Receiver | Mordant | w:x:y:z | $D_{max}/D_{min}$ R | G | B | Dye Loss Upon Incubation WD R | G | B |
|---|---|---|---|---|---|---|---|---|
| K | C-8 | 0:65:35:0 | 2.4/ 0.13 | 2.3/ 0.11 | 2.3/ 0.16 | 0.33 | 0.24 | 0.18 |
| L | C-9 | 0:66:24:10 | 3.0/ 0.16 | 2.7/ 0.13 | 2.7/ 0.18 | 0.53 | 0.43 | 0.28 |
| M | C-10 | 0:67:19:14 | 3.0/ 0.17 | 2.7/ 0.13 | 2.8/ 0.18 | 0.60 | 0.58 | 0.26 |
| N | Cmpd | 8:50:40:2 | 2.6/ | 2.6/ | 2.6/ | 0.21 | 0.23 | 0.17 |

TABLE 3-continued

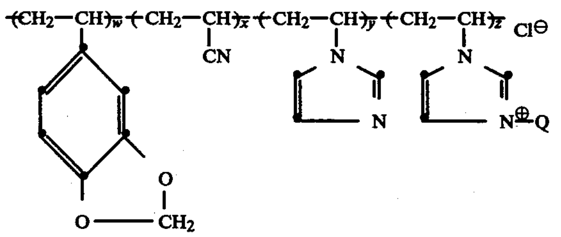

| Receiver | Mordant | w:x:y:z | $D_{max}/D_{min}$ R | G | B | Dye Loss Upon Incubation WD R | G | B |
|---|---|---|---|---|---|---|---|---|
| | 4 | | 0.11 | 0.11 | 0.12 | | | |
| O | Cmpd | 8:49:39:4 | 2.8/ | 2.7/ | 2.7/ | 0.24 | 0.24 | 0.18 |
| | 5 | | 0.12 | 0.11 | 0.13 | | | |
| P | Cmpd | 8:48:39:5 | 2.8/ | 2.7/ | 2.8/ | 0.26 | 0.26 | 0.19 |
| | 6 | | 0.13 | 0.11 | 0.14 | | | |
| Q | Cmpd | 8:47:38:7 | 2.9/ | 2.8/ | 2.9/ | 0.30 | 0.30 | 0.20 |
| | 7 | | 0.14 | 0.13 | 0.15 | | | |

The above results indicate that the control receivers L and M with high quaternization of the imidazole produced poor dye-light stability and high $D_{min}$. Although control receiver K with the non-quaternized mordant had acceptable $D_{min}$ and dye-light stability, related control mordants 1 and 7, receivers A and G in Example 3 and control mordant 7, receiver G, in Example 4 produced characteristic high image smear.

The receiver containing mordants according to the invention all had superior dye-light stability as compared to control receivers L and M. The dye-light stability progressively decreased and the $D_{min}$ increased with increasing quaternization. The data illustrates the necessity for maintaining quaternization below 10 mole percent.

Example 6—Photographic Test

A sample of receiving element E in Example 3 was used as the control.

R. A receiving element according to the invention was prepared similar to A in Example 3 except that the mordant was compound 8.

S. A receiving element according to the invention was prepared similar to A in Example 3 except that the mordant was compound 9.

T. A receiving element according to the invention was prepared similar to A in Example 3 except that the mordant was compound 10.

Processing was the same as in Example 4 with the following results:

TABLE 4

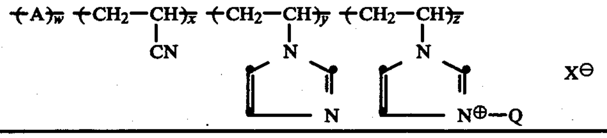

| Receiver | Mordant | A | Q | X | w:x:y:z (mole %) |
|---|---|---|---|---|---|
| E | C-5 | polym. styrene | $-CH_2CH_2OH$ | $Cl^{\ominus}$ | 48:0:43:9 |
| R | Cmpd 8 | 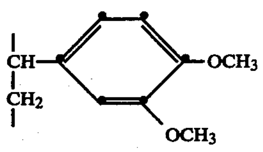 | 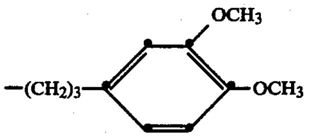 | $CH_3SO_3^{\ominus}$ | 22:44:29:5 |

TABLE 4-continued

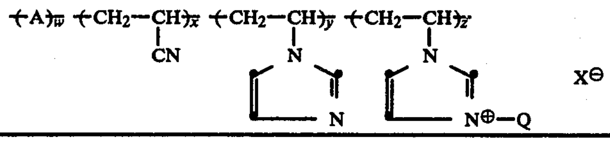

| | | | | | |
|---|---|---|---|---|---|
| S | Cmpd 9 | 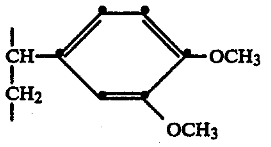 | $-CH_2CH_2OH$ | $Cl^{\ominus}$ | 8:44:39:9 |
| T | Cmpd 10 | 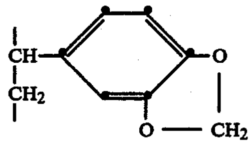 | $-CH_2CH_2OH$ | $Cl^{\ominus}$ | 9:50:36:5 |

| Receiver | $D_{max}/D_{min}$ R | G | B | Dye Loss Upon Incubation $\Delta D$ R | G | B | Fluorescent Dye Loss Upon Incubation $\Delta D$ R | G | B | Resolution Test Initial/ Incubated (lines/ mm) |
|---|---|---|---|---|---|---|---|---|---|---|
| E | 3.0/ 0.11 | 2.7/ 0.09 | 2.7/ 0.13 | 0.48 | 0.58 | 0.39 | 0.24 | 0.18 | 0.13 | 14/14 |
| R | 2.6/ 0.11 | 2.5/ 0.09 | 2.4/ 0.13 | 0.43 | 0.55 | 0.31 | 0.20 | 0.15 | 0.10 | 13/11 |
| E | 3.0/ 0.13 | 2.8/ 0.11 | 2.7/ 0.15 | 0.43 | 0.51 | 0.34 | 0.29 | 0.22 | 0.13 | 14/14 |
| S | 3.0/ 0.13 | 2.7/ 0.11 | 2.7/ 0.17 | 0.33 | 0.39 | 0.25 | 0.16 | 0.14 | 0.09 | 14/14 |
| E | 2.9/ 0.16 | 2.7/ 0.12 | 2.6/ 0.16 | 0.38 | 0.51 | 0.31 | 0.28 | 0.21 | 0.13 | 14/13 |
| T | 2.9/ 0.13 | 2.6/ 0.11 | 2.7/ 0.16 | 0.23 | 0.20 | 0.16 | 0.20 | 0.09 | 0.10 | 13/11 |

The above results indicate that the receivers containing the mordants according to the invention had improved stability for all three dyes as compared to a control under both high intensity daylight and fluorescent fade conditions. All three mordants of the invention gave sharp initial images that did not undergo severe image smearing upon incubation. The mordant polymers of the invention thus had the best balance of desirable properties.

Example 7—Photographic Test

A sample of receiving element E in Example 3 was used as the control

U. A receiving element according to the invention was prepared similar to A in Example 3 except that the mordant was compound 11.

V. A receiving element according to the invention was prepared similar to A in Example 3 except that the mordant was compound 12.

W. A receiving element according to the invention was prepared similar to A in Example 3 except that the mordant was compound 13.

Processing was the same as in Example 4 with the following results:

TABLE 5

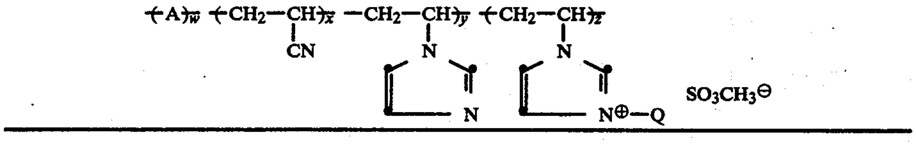

| Receiver | Mordant | A | Q | w:x:y:z (mole %) |
|---|---|---|---|---|
| E | C-5 | $-CH_2-CH-C_6H_5$ | $-CH_2CH_2OH$ | 50:0:40:10 |

TABLE 5-continued

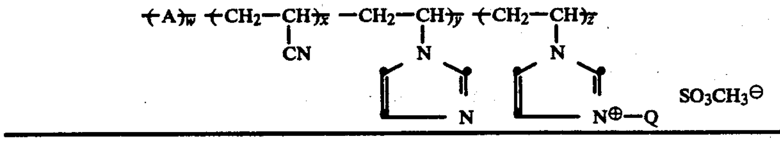

| | | | |
|---|---|---|---|
| U | Cmpd 11 | 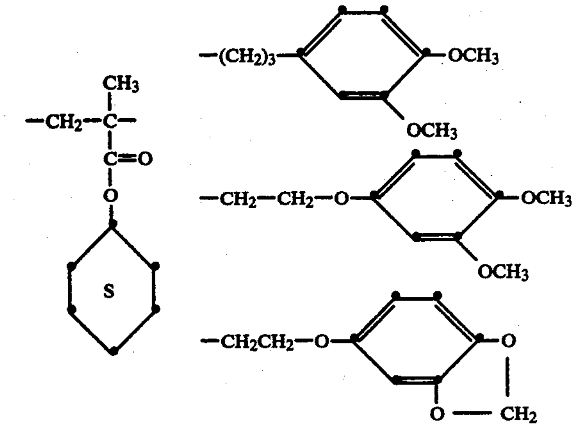 | 8:52:35:5 |
| V | Cmpd 12 | | 8:52:32:8 |
| W | Cmpd 13 | | 8:52:32:8 |

| Receiver | $D_{max}/D_{min}$ R | G | B | Dye Loss Upon Incubation ΔD R | G | B | Fluorescent Dye Loss Upon Incubation ΔD R | G | B | Resolution Test Initial/Incubated (lines/mm) |
|---|---|---|---|---|---|---|---|---|---|---|
| E | 3.0/ 0.11 | 2.7/ 0.09 | 2.7/ 0.13 | 0.48 | 0.58 | 0.39 | 0.24 | 0.18 | 0.13 | 14/14 |
| U | 2.9/ 0.12 | 2.7/ 0.08 | 2.7/ 0.15 | 0.34 | 0.43 | 0.27 | 0.18 | 0.13 | 0.09 | 13/13 |
| V | 3.0/ 0.10 | 2.7/ 0.08 | 2.7/ 0.16 | 0.38 | 0.47 | 0.28 | 0.14 | 0.11 | 0.08 | 14/13 |
| W | 2.9/ 0.12 | 2.7/ 0.11 | 2.4/ 0.13 | 0.37 | 0.40 | 0.26 | 0.15 | 0.10 | 0.07 | 14/13 |

The above results indicate that the receivers containing the mordants according to the invention had improved stability for all three dyes as compared to the control under both high intensity daylight and fluorescent fade conditions. All three mordants of the invention also gave sharp initial images that did not smear appreciably upon incubation.

The invention has been described in detail with particular reference to preferred embodiments thereof, but it will be understood that variations and modifications can be effected within the spirit and scope of the invention.

What is claimed is:

1. In a photographic element comprising a support having thereon at least one photosensitive silver halide emulsion layer having associated therewith a dye image-providing material, said support also having thereon a dye image-receiving layer comprising a mordant, the improvement wherein said mordant is a polymer comprising recurring units having the formula:

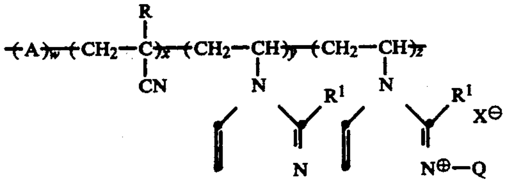

wherein

A represents recurring units derived from an α,β-ethylenically unsaturated monomer;

R represents hydrogen or methyl;

each $R^1$ independently represents hydrogen or an alkyl group of 1 to about 4 carbon atoms;

Q represents an alkyl, substituted alkyl, cycloalkyl, aryl or substituted aryl group;

$X^{\ominus}$ represents an anion;

w is from about 0 to about 25 mole percent;

x is from about 30 to about 90 mole percent;

y is from about 8 to about 65 mole percent; and z is from about 2 to about 9 mole percent.

2. The photographic element of claim 1 wherein R is hydrogen, each $R^1$ is hydrogen, w is 0 and Q is a hydroxyalkyl group.

3. The photographic element of claim 1 wherein R is hydrogen, each $R^1$ is hydrogen, Q is a hydroxyalkyl group, A represents a styrene moiety, and w is from about 5 to about 15 mole percent.

4. The photographic element of claim 3 wherein said styrene moiety is substituted with at least one methoxy or methylenedioxy group.

5. The photographic element of claim 1 wherein R is hydrogen, each $R^1$ is hydrogen and Q is benzyl, 3-(4-methoxyphenoxy)-2-hydroxypropyl, 3-(3,4-dimethoxyphenyl)propyl, 2-(3,4-methylenedioxyphenoxy)ethyl, or 2-(3,4-dimethoxyphenoxy)ethyl.

6. The element of claim 1 wherein said support has thereon a red-sensitive siler halide emulsion layer having a cyan dye image-providing material associated therewith, a green-sensitive silver halide emulsion layer having a magenta dye image-providing material associated therewith, and a blue-sensitive silver halide emulsion layer having a yellow dye image-providing material associated therewith.

7. In a photographic assemblage comprising:

(a) a support having thereon at least one photosensitive silver halide emulsion layer having associated therewith a dye image-providing material;

and (b) a dye image-receiving layer comprising a mordant, the improvement wherein said mordant is a polymer comprising recurring units having the formula:

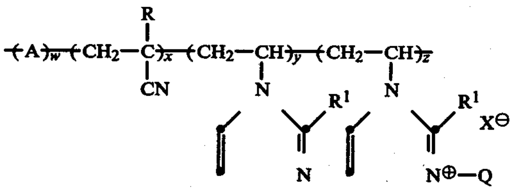

wherein

A represents recurring units derived from an $\alpha,\beta$-ethylenically unsaturated monomer;

R represents hydrogen or methyl;

each $R^1$ independently represents hydrogen or an alkyl group of 1 to about 4 carbon atoms;

Q represents an alkyl, substituted alkyl, cycloalkyl, aryl or substituted aryl group;

$X^{\ominus}$ represents an anion;

w is from about 0 to about 25 mole percent;

x is from about 30 to about 90 mole percent;

y is from about 8 to about 65 mole percent;

and z is from about 2 to about 9 mole percent.

8. The assemblage of claim 7 which also contains an alkaline processing composition and means containing same for discharge within said assemblage.

9. The assemblage of claim 8 wherein R is hydrogen, each $R^1$ is hydrogen, w is 0 and Q is a hydroxyalkyl group.

10. The assemblage of claim 8 wherein R is hydrogen, each $R^1$ is hydrogen, Q is a hydroxyalkyl group, A represents a styrene moiety, and w is from about 5 to about 15 mole percent.

11. The assemblage of claim 10 wherein said styrene moiety is substituted with at least one methoxy or methylenedioxy group.

12. The assemblage of claim 8 wherein R is hydrogen, each $R^1$ is hydrogen and Q is benzyl, 3-(4-methoxyphenoxy)-2-hydroxypropyl, 3-(3,4-dimethoxyphenyl)-propyl, 2-(3,4-methylenedioxyphenoxy)ethyl, or 2-(3,4-dimethoxyphenoxy)ethyl.

13. The assemblage of claim 8 wherein (a) said dye image-receiving layer is located in said photosensitive element between said support and said silver halide emulsion layer; and (b) said assemblage also includes a transparent cover sheet over the layer outermost from said support.

14. The assemblage of claim 13 wherein said transparent cover sheet is coated with, in sequence, a neutralizing layer and a timing layer.

15. The assemblage of claim 14 wherein said discharging means is a rupturable container containing said alkaline processing composition and an opacifying agent, said container being so positioned, that during processing of said assemblage, a compressive force applied to said container will effect a discharge of the container's contents between said transparent cover sheet and the layer outermost from said support.

16. The assemblage of claim 8 wherein said support of said photosensitive element is opaque, and said dye image-receiving layer is located on a separate transparent support superposed on the layer outermost from said opaque support.

17. The assemblage of claim 16 wherein said transparent support has thereon, in sequence, a neutralizing layer, a timing layer and said dye image-receiving layer.

18. The assemblage of claim 16 wherein said opaque support has thereon, in sequence, a neutralizing layer, a timing layer and said silver halide emulsion layer.

19. The assemblage of claim 8 wherein said dye image-providing material is a redox dye-releaser.

20. The assemblage of claim 8 wherein said photosensitive element comprises a support having thereon a red-sensitive silver halide emulsion layer having a cyan dye image-providing material associated therewith, a green-sensitive silver halide emulsion layer having a magenta dye image-providing material associated therewith, and a blue-sensitive silver halide emulsion layer having a yellow dye image-providing material associated therewith.

21. In an integral photographic assemblage comprising (a) a photosensitive element comprising a transparent support having thereon the following layers in sequence: a dye image-receiving layer comprising a mordant, an alkaline solution-permeable, light-reflective layer; an alkaline solution-permeable, opaque layer; a red-sensitive, direct-positive silver halide emulsion layer having a ballasted redox cyan dye-releaser associated therewith; a green-sensitive, direct-positive silver halide emulsion layer having a ballasted redox magenta dye-releaser associated therewith; and a blue-sensitive, direct-positive silver halide emulsion layer having a ballasted redox yellow dye-releaser associated therewith;

(b) a transparent sheet superposed over said blue-sensitive silver halide emulsion layer and comprising a transparent support coated with, in sequence, a neutralizing layer and a timing layer; and (c) a rupturable container containing an alkaline processing composition and an opacifying agent, said container being so positioned during processing of said assemblage that a compressive force applied to said container will effect a discharge of the container's contents between said transparent sheet and said blue-sensitive silver halide emulsion layer; said assemblage containing a silver halide developing agent, the improvement wherein said mordant is a polymer comprising recurring units having the formula:

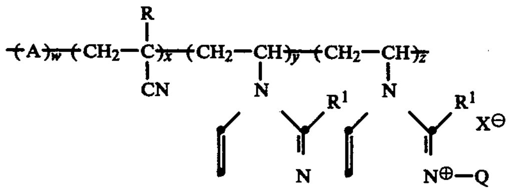

wherein

A represents recurring units derived from an $\alpha,\beta$-ethylenically unsaturated monomer;

R represents hydrogen or methyl;

each $R^1$ independently represents hydrogen or an alkyl group of 1 to about 4 carbon atoms;

Q represents an alkyl, substituted alkyl, cycloalkyl, aryl or substituted aryl group;

$X^\ominus$ represents an anion;

w is from about 0 to about 25 mole percent;

x is from about 30 to about 90 mole percent;

y is from about 8 to about 65 mole percent;

and z is from about 2 to about 9 mole percent.

22. The assemblage of claim 21 wherein R is hydrogen, each $R^1$ is hydrogen, w is 0 and Q is a hydroxyalkyl group.

23. The assemblage of claim 21 wherein R is hydrogen, each $R^1$ is hydrogen, Q is a hydroxyalkyl group, A represents a styrene moiety, and w is from about 5 to about 15 mole percent.

24. In a photographic element comprising a support having thereon a dye image-receiving layer comprising a mordant, the improvement wherein said mordant is a polymer comprising recurring units having the formula:

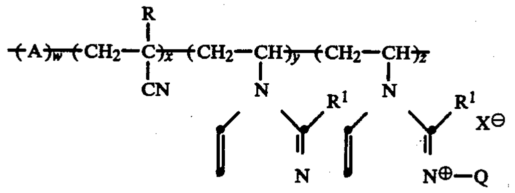

wherein

A represents recurring units derived from an $\alpha,\beta$-ethylenically unsaturated monomer;

R represents hydrogen or methyl;

each $R^1$ independently represents hydrogen or an alkyl group of 1 to about 4 carbon atoms;

Q represents an alkyl, substituted alkyl, cycloalkyl, aryl or substituted aryl group;

$X^\ominus$ represents an anion;

w is from about 0 to about 25 mole percent;

x is from about 30 to about 90 mole percent;

y is from about 8to about 65 mole percent;

and z is from about 2 to about 9 mole percent.

25. The element of claim 24 wherein R is hydrogen, each $R^1$ is hydrogen, w is 0 and Q is a hydroxyalkyl group.

26. The element of claim 24 wherein R is hydrogen, each $R^1$ is hydrogen, Q is a hydroxyalkyl group, A represents a styrene moiety, and w is from about 5 to about 15 mole percent.

27. The element of claim 26 wherein wherein said styrene moiety is substituted with at least one methoxy or methylenedioxy group.

28. The element of claim 24 wherein R is hydrogen, each $R^1$ is hydrogen and Q is benzyl, 3-(4-methoxyphenoxy)-2-hydroxypropyl, 3-(3,4-dimethoxyphenyl)-propyl, 2-(3,4-methylenedioxyphenoxy)ethyl, or 2-(3,4-dimethoxyphenoxy)ethyl.

29. A polymer comprising recurring units having the formula:

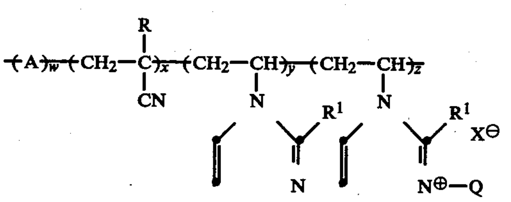

wherein

A represents recurring units derived from an $\alpha,\beta$-ethylenically unsaturated monomer;

R represents hydrogen or methyl;

each $R^1$ independently represents hydrogen or an alkyl group of 1 to about 4 carbon atoms;

Q represents an alkyl, substituted alkyl, cycloalkyl, aryl or substituted aryl group;

$X^\ominus$ represents an anion;

w is from about 0 to about 25 mole percent;

x is from about 30 to about 90 mole percent;

y is from about 8 to about 65 mole percent;

and z is from about 2 to about 9 mole percent.

30. The polymer of claim 29 wherein R is hydrogen, each $R^1$ is hydrogen, w is 0 and Q is a hydroxyalkyl group.

31. The polymer of claim 29 wherein R is hydrogen, each $R^1$ is hydrogen, Q is a hydroxyalkyl group, A represents a styrene moiety, and w is from about 5 to about 15 mole percent.

32. The polymer of claim 31 wherein wherein said styrene moiety is substituted with at least one methoxy or methylenedioxy group.

33. The polymer of claim 29 wherein R is hydrogen, each $R^1$ is hydrogen and Q is benzyl, 3-(4-methoxyphenoxy)-2-hydroxypropyl, 3-(3,4-dimethoxyphenyl)-propyl, 2-(3,4-methylenedioxyphenoxy)ethyl, or 2-(3,4-dimethoxyphenoxy)ethyl.

* * * * *